(12) United States Patent
Masuda

(10) Patent No.: US 9,217,453 B2
(45) Date of Patent: Dec. 22, 2015

(54) MOUNTING STRUCTURE FOR PARTS

(71) Applicant: TOYODA GOSEI CO., LTD., Kiyosu-shi, Aichi-ken (JP)

(72) Inventor: Tomoaki Masuda, Inazawa (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 471 days.

(21) Appl. No.: 13/772,375

(22) Filed: Feb. 21, 2013

(65) Prior Publication Data
US 2014/0093311 A1  Apr. 3, 2014

(30) Foreign Application Priority Data

Sep. 28, 2012 (JP) ................. 2012-215827

(51) Int. Cl.
*F16B 17/00* (2006.01)
*B60N 3/02* (2006.01)

(52) U.S. Cl.
CPC ................. *F16B 17/00* (2013.01); *B60N 3/026* (2013.01); *Y10T 403/60* (2013.01)

(58) Field of Classification Search
CPC ...... F16B 21/00; F16B 21/086; F16B 21/075; F16B 19/1081; F16B 5/06; F16B 5/065; F16B 5/0642; B60R 13/02; B60R 13/0206; B60N 3/02; B60N 3/023; B60N 3/026
See application file for complete search history.

(56) References Cited

U.S. PATENT DOCUMENTS

| | | | |
|---|---|---|---|
| 6,074,150 A * | 6/2000 | Shinozaki et al. | 411/508 |
| 7,308,736 B2 * | 12/2007 | Nakazato | 24/289 |
| 7,374,200 B2 * | 5/2008 | Ikeda et al. | 280/728.2 |
| 7,415,751 B2 | 8/2008 | Kato et al. | |
| 8,152,405 B2 * | 4/2012 | Dubost | 403/388 |
| 8,210,588 B2 * | 7/2012 | Boehner et al. | 296/1.02 |
| 8,496,420 B2 * | 7/2013 | Aoki et al. | 411/45 |
| 8,641,116 B2 * | 2/2014 | Le Tinnier et al. | 296/1.02 |
| 2003/0234549 A1 * | 12/2003 | Totani et al. | 296/1.02 |
| 2005/0116485 A1 * | 6/2005 | Kuroda | 296/1.08 |

(Continued)

FOREIGN PATENT DOCUMENTS

| | | |
|---|---|---|
| CN | 1819937 A | 8/2006 |
| CN | 101434211 A | 5/2009 |

(Continued)

OTHER PUBLICATIONS

Office action issued Jul. 20, 2015 by the Chinese Patent Office in the corresponding Chinese patent application No. 201310074834.2.

*Primary Examiner* — Daniel Wiley
(74) *Attorney, Agent, or Firm* — Posz Law Group, PLC

(57) ABSTRACT

A mounting structure comprises a part with a base, a mounting member with a mounting hole, a clip and a cap. The base has a temporary fixing part configured to fix the cap in a temporary fixed position, a permanent fixing part configured to locate the cap in a permanent fixed position, and an elastic hooking pawl configured to restrict entry of the cap into the permanent fixed position by interfering with insertion of the cap when held in the temporary fixed position. When the cap is inserted from the temporary fixed position to the permanent fixed position, each of the elastic lockable parts of the clip are deformed toward a mounting hole and press against the elastic hooking pawl such that the elastic hooking pawl does not interfere with the insertion path of the cap from the temporary fixed position to the permanent fixed position.

3 Claims, 15 Drawing Sheets

(56) References Cited

U.S. PATENT DOCUMENTS

2007/0102944 A1* 5/2007 Kato et al. .................. 296/1.02
2008/0018128 A1* 1/2008 Yamagiwa et al. .......... 296/1.02
2008/0098563 A1 5/2008 Lee et al.
2010/0175220 A1* 7/2010 Kajio et al. ................. 16/110.1

FOREIGN PATENT DOCUMENTS

| | | |
|---|---|---|
| CN | 201362198 Y | 12/2009 |
| JP | 2009-120119 A | 6/2009 |
| JP | 2010-195161 A | 9/2010 |

* cited by examiner (Start insertion)

(In course of insertion)

MOUNTING STRUCTURE FOR PARTS

TECHNICAL FIELD

The present invention relates to a mounting structure for parts, such as vehicle parts, to be mounted on a mounting member.

BACKGROUND ART

An assist grip mounted on a vehicle comprises, as shown, for example, in FIG. 1 described below: a long grip body 10; bases 11 attached to both ends of the grip body 10; clips 3 for mounting the corresponding bases 11 in mounting holes 2a formed in a vehicle-body-side panel 2; and caps 4 for covering the corresponding clips 3.

To mount the assist grip on the vehicle-body-side panel 2, the bases 11, clips 3 and caps 4 are fitted to and temporarily fixed to the grip body 10. These temporarily fixed parts are conveyed into a workshop for vehicle assembly, where they are mounted on and permanently fixed to the vehicle-body-side panel 2.

The foregoing type of assist grip, which is mounted on the vehicle-body-side panel 2 through such a temporarily fixed state, is disclosed in, for example, Jap. Pat. Appln. KOKAI Publication No. 2009-120119. The upper and lower drawings of FIG. 15 correspond to FIGS. 8 and 9 of Jap. Pat. Appln. KOKAI Publication No. 2009-120119 and show a temporarily fixed state of the assist grip. The upper and lower drawings of FIG. 16 correspond to FIGS. 12 and 13 of Jap. Pat. Appln. KOKAI Publication No. 2009-120119 and show a permanently fixed state of the assist grip.

As shown in FIG. 15, in the temporarily fixed assist grip 91, a clip 93 is inserted in a clip-holding hole 911b formed in a base 911. A cap 94 is inserted in an internal space defined between a pair of side walls 93e of the clip 93. The cap 94 blocks the clip-holding hole 911b and prevents separation of the clip 93 from the clip-holding hole 911b. The cap 94 is locked in a temporarily fixing lock recess 911q formed in a side wall of the base 911. The outside of the cap 94 is covered by the internal surface of a recess 910a of a grip body 910. By virtue of this, even in a case where a significant load is applied to the cap 94 in the direction of cap insertion, the cap 94 is prevented from being deformed, is kept locked in the temporarily fixing lock recess 911q, and held in the temporarily fixed position.

As shown in FIG. 16, to fix the assist grip 91 to a vehicle-body-side panel 92, the clip 93 is inserted into a mounting hole 92a formed in this panel 92 (in the first step). The recess 910a is uncovered to expose the cap 94 by turning the grip body 910 (in the second step). The cap 94 is pushed in the direction of insertion, thereby deforming the cap 94 outside and unlocking the cap 94 from the temporarily fixing lock recess 911q (in the third step). The cap 94 further advances into the internal space of the clip 93. The cap 94 is fixed in the base 911 by its being locked into a permanent fixing lock recess 911r formed in a side wall of the base 911.

SUMMARY OF INVENTION

Technical Problem

However, according to the Jap. Pat. Appln. KOKAI Publication No. 2009-120119, a locked projection 94g of the cap 94 is covered by the internal surface of the recess 910a of the grip body 910, thereby preventing deformation of the cap 94 and restricting disengagement of the locked projection 94g from the temporarily fixing lock recess 911q even if external force is applied thereto. Thus, the temporarily fixed cap 94 is prevented from being erroneously fixed in a permanently fixed position. Therefore, when the assist grip is shifted from a temporarily fixed state to a permanent fixed state, it is necessary to cancel restriction of disengagement of the locked projection 94g from the temporarily fixing lock recess 911q, by rotating the grip body 910 to expose the cap 94, thereby allowing deformation of the cap 94. The foregoing mounting requires a great deal of man-hours and labor.

The present invention has been proposed in view of the foregoing problem. Accordingly, it is an object of the present invention to provide a mounting structure for parts that makes it possible to reduce the man-hours required to mount parts on a mounting member.

Solution to Problem (1) To achieve the foregoing object, the present invention provides a mounting structure for parts, the structure comprising: a part with a base; a mounting member with a mounting hole; a clip including a held part, which is held by the base, a pair of side walls inserted into the mounting hole, and an elastic lockable part provided on each side wall and locked on a peripheral edge of the mounting hole, wherein the pair of side walls define an internal space between them, are connected at the leading ends thereof, and define an opening at the basal ends thereof, the opening communicating with the internal space; and a cap inserted into the internal space from the opening, and located in a permanently fixed position where the elastic lockable part is pressed toward the outside of the internal space, thereby keeping the elastic lockable part locked on the peripheral edge of the mounting hole. The base has a temporarily fixing part configured to temporarily fix the cap in a temporarily fixed position that is in front of the permanently fixed position, has a permanently fixing part configured to locate the cap in the permanently fixed position that is further away in the direction of insertion than the temporarily fixed position, and has an elastic hooking pawl configured to restrict entry of the cap into the permanently fixed position by its being disposed in an interference area that interferes with an insertion path extending from the temporarily fixed position for the cap to the permanently fixed position for this cap when the cap is held in the temporarily fixed position; and wherein, when the cap is moved further in the direction of insertion from the temporarily fixed position to the permanently fixed position, each of the elastic lockable parts of the clip is elastically deformed toward the inside of the internal space by an internal wall of the mounting hole and is pressed against the elastic hooking pawl such that the elastic hooking pawl is withdrawn from the interference area provided for the cap to cancel the restriction for the entry of the cap.

According to this configuration, the base has the elastic hooking pawl. This elastic hooking pawl is disposed in the interference area that interferes with the insertion path of the cap when the cap is held in a temporarily fixed position. In this case, "the interference area that interferes with the insertion path from the temporarily fixed position for the cap to the permanently fixed position for the cap" may be the temporarily fixed position of the cap or may be at any point in the insertion path from the temporarily fixed position to the permanently fixed position of the cap. Since the cap is disposed in such an interference area, the cap is prevented from entering the permanently fixed position erroneously even if significant load is applied in the direction of insertion to the temporarily fixed cap during the conveyance of an assist grip.

To mount the assist grip on the mounting member, the clip is disposed above the mounting hole of the mounting member, and load is applied to the cap in the direction of insertion, thereby inserting the clip into this mounting hole. After insertion of the clip into this hole, load is applied to the cap in the direction of insertion. Consequently, the clip enters the mounting hole and the elastic lockable parts are elastically deformed toward the inside of the internal space by the internal walls of the mounting hole. The elastically deformed elastic lockable parts are pressed against the elastic locking pawl, thereby withdrawing the elastic hooking pawl from the interference area that interferes with the insertion path of the cap. Consequently, the cap is released from interference with the elastic hooking pawl and is able to move further in the direction of insertion. Accordingly, the cap is held in the permanently fixed position and the mounting of the part on the mounting member is completed.

By simply applying load on the cap in such a manner, the clip is inserted into the mounting hole and the cap is permanently fixed, in a single step. Also, the cap can be permanently fixed by pressing the grip body against the cap. This eliminates the need to expose the cap by rotating the grip body relative to the bases, as in a conventional manner.

As described above, according the present invention, the cap can be shifted from a temporarily fixed position to a permanently fixed position by inserting the clip into the mounting hole. Accordingly, man-hours required for fitting the part to the mounting member can be reduced remarkably.

(2) It is preferable that the base have a restricting part that extends in the direction of insertion of the cap and presses the clip in the direction of insertion of the cap, thereby restricting movement of the clip in a direction in which the clip is separable from the mounting hole, preferable that a first end of the elastic hooking pawl in the direction of insertion of the cap be connected to the restricting part, and preferable that a second end thereof, which is opposite the first end in the direction of insertion of the cap, be a free end and located in the interference area.

Accordingly, when the cap is in a temporarily fixed position, the clip is pressed in the direction of insertion of the cap, thereby restricting movement of the clip in a direction in which the clip is separable from the clip holding hole of the base.

(3) It is preferable that the elastic hooking pawl extend from the first end, connected to the restricting part, at an angle to the direction of separation of the cap and that this pawl be bent or curved near the second end so as to be parallel to the direction of separation of the cap.

Since the free end of the elastic hooking pawl extends in the direction of separation of the cap, the strength of the elastic hooking pawl increases with load applied in the direction of insertion. Therefore, even if load is applied to the temporarily fixed cap in the direction of insertion, the elastic hooking pawl is sufficient to withstand the load transmitted from the cap.

Advantageous Effects of Invention

In a mounting structure for parts, according to the present invention, since a base has an elastic hooking pawl that is disposed in an interference area that interferes with the insertion path extending from the temporarily fixed position for the cap to the permanently fixed position, the cap is prevented from being erroneously moved further in the direction of insertion when located in the temporarily fixed position. Upon insertion of a clip into the mounting hole, elastic lockable parts are elastically deformed inside by the internal walls of the mounting hole, thereby elastically deforming the elastic hooking pawl. Consequently, the cap is released from the elastic hooking pawl restricting its entry, and the cap is able to enter a permanently fixed position from a temporarily fixed position in a single step. Accordingly, man-hours for mounting parts can be reduced.

DESCRIPTION OF EMBODIMENTS

Figure 1:
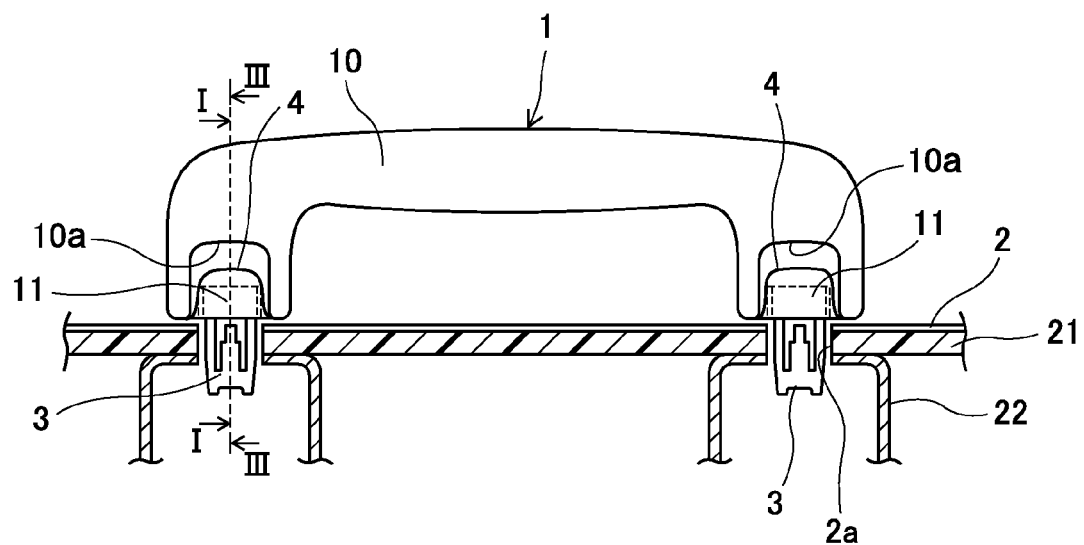
FIG. 1 is a front view of a mounting structure for an assist grip, according to an embodiment of the present invention.
Figure 2:
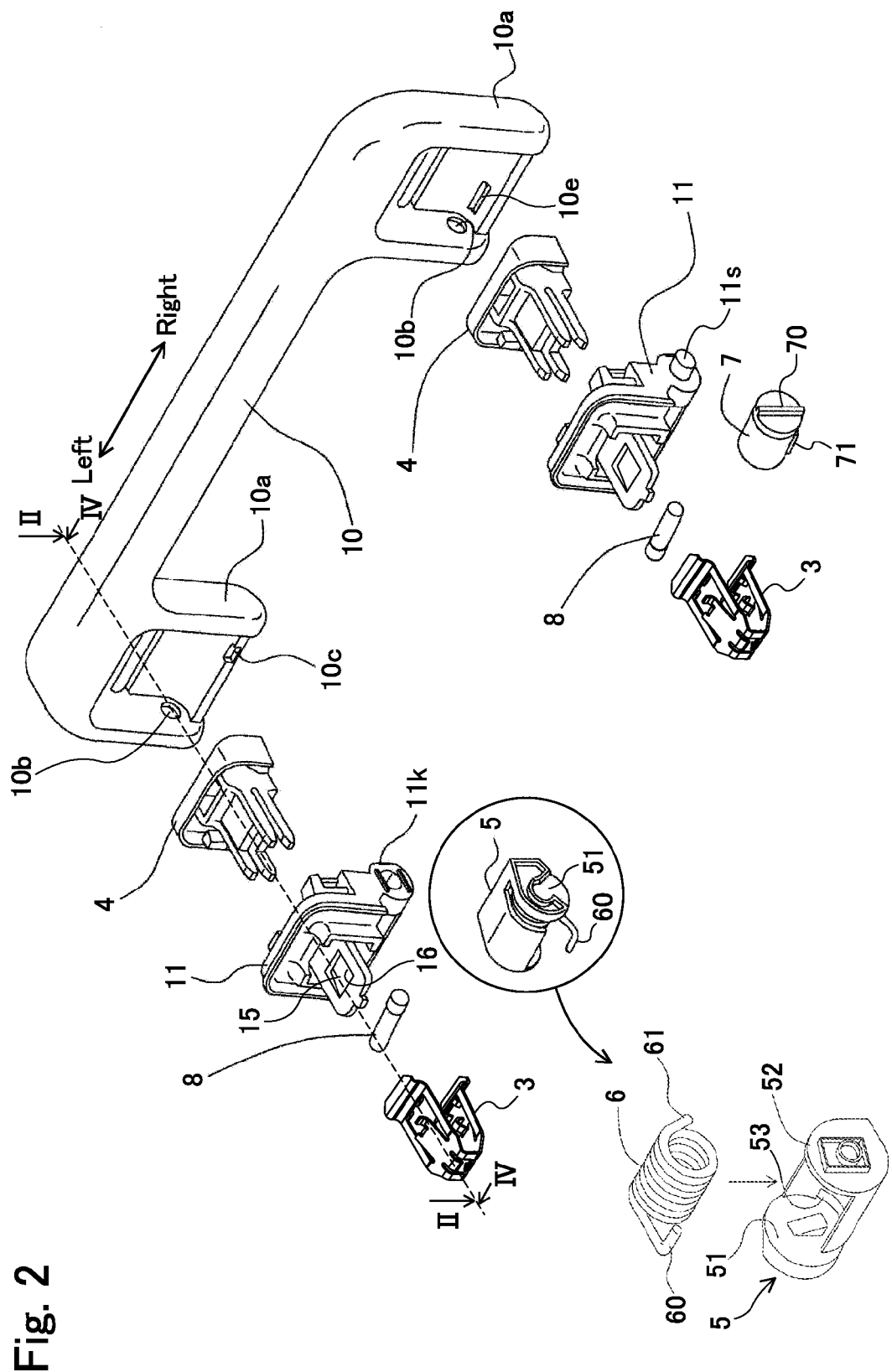
FIG. 2 is an exploded perspective view of the mounting structure for the assist grip, according to the embodiment.

A mounting structure for parts, according to a preferred embodiment of the present invention, will be described with reference to the drawings. In the present invention, one part is an assist grip for a vehicle and one mounting member is a vehicle-body-side panel. FIG. 1 is a front view of an assist grip 1 mounted on a vehicle-body-side panel 2. FIG. 2 is an exploded perspective view of the assist grip 1. The assist grip 1 includes a grip body 10, bases 11, clips 3, and caps 4.

The grip body 10 is long sidewise and has recesses 10a in its longitudinal left and right ends. Each recess 10a accommodates the corresponding base 11. Both left and right side walls of each recess 10a have corresponding shaft holes 10b.

Figure 3:
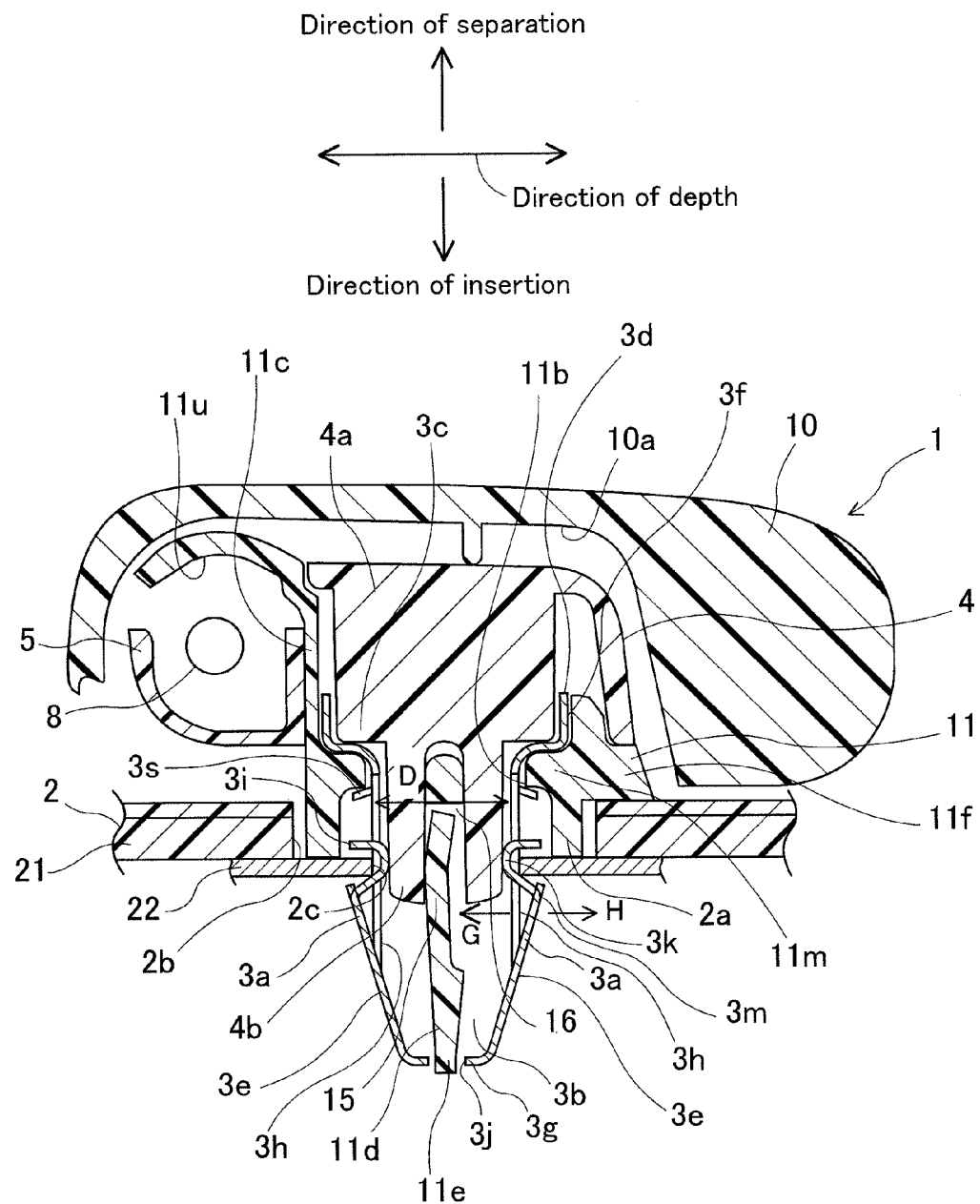
FIG. 3 is a sectional view taken along the line I-I in FIG. 1 indicating the mounting structure for an assist grip when the grip main body is held on the vehicle-body-side panel in a mounted state.

FIG. 3 is a sectional view of a main section of the mounting structure for the assist grip. In FIG. 3, the direction of the lower side of the drawing is assumed to be the direction of insertion; the direction of the upper side of the drawing, the direction of separation; the lateral direction of the drawing, the direction of depth of the internal space of the clip. Additionally, a direction toward the center of the depth between a pair of side walls of the clip is assumed to be a direction G toward the center of depth; and a direction toward the outside of the depth between side walls of the clip, a direction H toward the outside of the depth. The depth of internal space between side walls of the clip is assumed to be a depth D. These assumptions are applied in FIG. 4 and the subsequent figures.

As shown in FIG. 3, the vehicle-body-side panel 2 includes a surface panel 21 exposed in the vehicle interior, and an internal panel 22 interposed between the surface panel 21 and the body. The surface panel 21 is obtained by pasting a covering material to the ceiling panel of the vehicle. Mounting holes 2a are formed through the surface panel 21 and internal panel 22 in the positions where the bases 11 are attached. Each mounting hole 2a includes a surface-panel pierced portion 2b, which is formed through the surface panel 21, and an internal-panel pierced portion 2c, which is formed through the internal panel 22. Since the diameter of the opening of the surface-panel pierced portion 2b of the mounting hole 2a is greater than that of the internal-panel pierced portion 2c, the peripheral edge of the internal-panel pierced portion 2c is exposed in the surface-panel pierced portion 2b.

Figure 4:
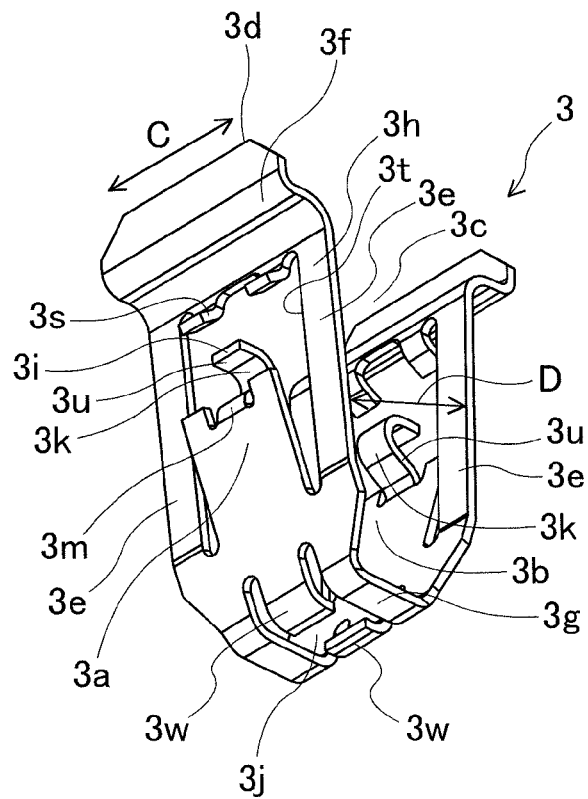
FIG. 4 is a perspective view of a clip according to the embodiment.

As shown in FIGS. 3 and 4, the clip 3 has a U-shaped cross-section. The clip 3 has a pair of side walls 3e with an internal space 3b between them. The leading ends 3g of the pair of side walls 3e are connected to each other in a U-shaped curve. The basal ends 3d of the pair of side walls 3e are not connected to each other. Defined between the basal ends 3d of the pair of side walls 3e is an opening 3c communicating with the internal space 3b. The clip 3 is fitted into the mounting hole 2a of the vehicle-body-side panel 2 in a longitudinal direction of the clip 3.

Each side wall 3e has a hole 3t in the form of a rectangular opening, and an elastic lockable part 3a located opposite a direction orthogonal to the longitudinal direction, that is, in the direction of depth of the internal space 3b. The elastic lockable part 3a extends from the edge of the hole 3t of the side wall 3e, which edge is located at the side of the leading end 3g. This locking part 3a has a protrusion 3m, which protrudes in the shape of a laterally turned letter V extending in the direction H toward the outside of the depth with respect to a flat part 3h parallel to the longitudinal direction of the side wall 3e.

A curved projection 3u extends widthwise from the middle of the protrusion 3m of the elastic lockable part 3a. The curved projection 3u curves in a U-shape in the direction of the center of depth of the internal space 3a. The furthest receding part 3k of the curved projection 3u is located inside the flat part 3h in the direction of depth before the insertion of the leg parts 4b of the cap 4. The end 3i of the curved projection 3u serves also as the leading end 3i of the elastic lockable part 3a. This end 3i projects further than the flat part 3h in the direction H toward the outside of the depth.

Provided at the side of the basal end 3d of the side wall 3e rather than at the side of the elastic lockable part 3a is a step 3f serving as a held part, which is held by the base 11. The step 3f is a portion formed by bending the side wall 3e in an L-shape in the direction H toward the outside of the depth. Additionally, formed on the underside of the step 3f are a pair of pawls 3s extending from the edge of the hole 3t at the side of the basal end 3d. Each clip 3 is formed by punching and bending a metal plate. Alternatively, the clip 3 may be formed of, for example, injection molded resin.

Figure 5:
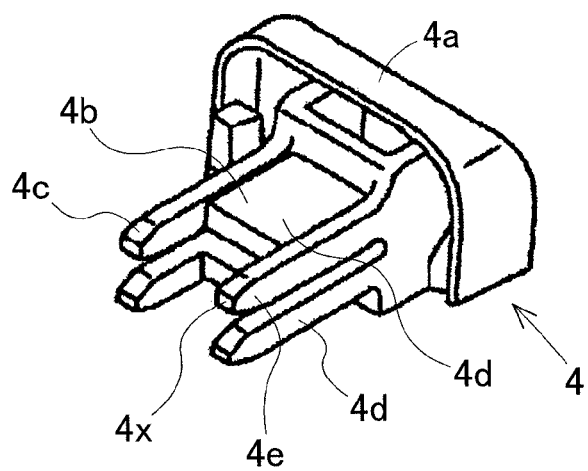
FIG. 5 is a perspective view of a cap according to the embodiment.
Figure 10:
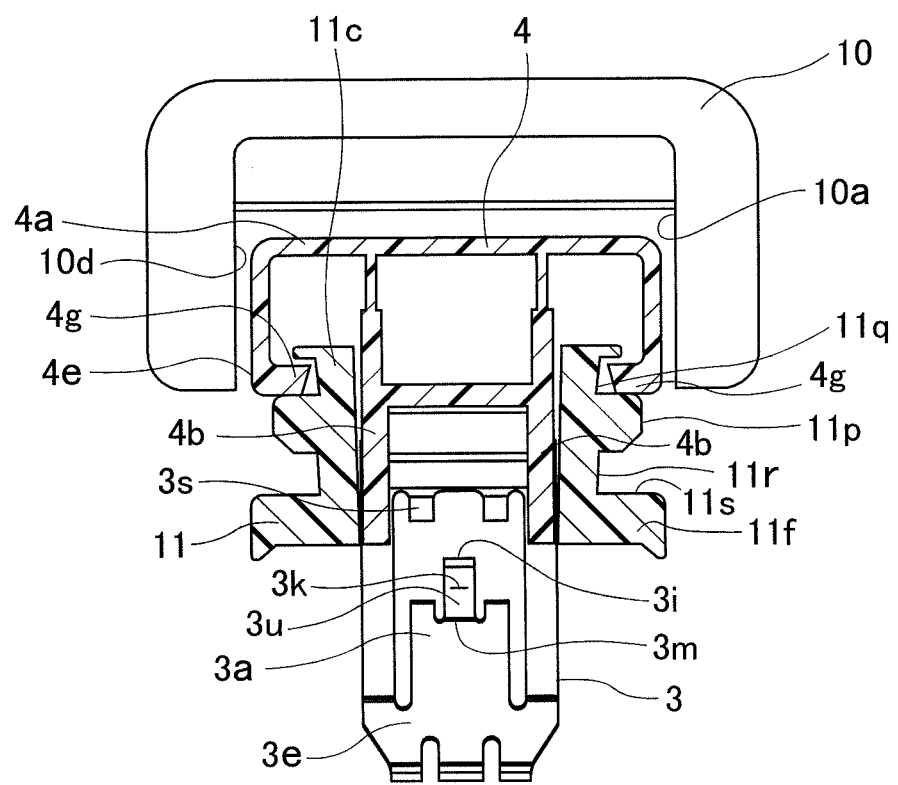
FIG. 10 is a sectional view taken along the line II-II in FIG. 2 indicating the mounting structure for an assist grip during a mounting process.

As shown in FIGS. 3 and 5, the cap 4 has a cover 4a for covering the basal end 3d of the clip 3, and leg parts 4b, which are inserted into the internal space 3b from the opening 3c of the clip 3 and which extend in the direction of insertion. The cover 4a curves in a U shape in cross-section so as to cover the upper surface and sides of a cap holding wall 11c formed in the upper part of the base 11. The leg parts 4b have four posts 4c located at the four corners of a rectangle, and a pair of sandwiched flat parts 4d connecting the corresponding adjacent posts 4c. The thickness of the leg parts 4b in the direction of depth gradually decreases in the vicinity of the leading end 4x in the direction in which the leg parts 4b are inserted. As shown in FIG. 10, formed on the internal surface of the side wall of the cover 4a of the cap 4 is a locked part 4g projecting inwards.

Figure 6:
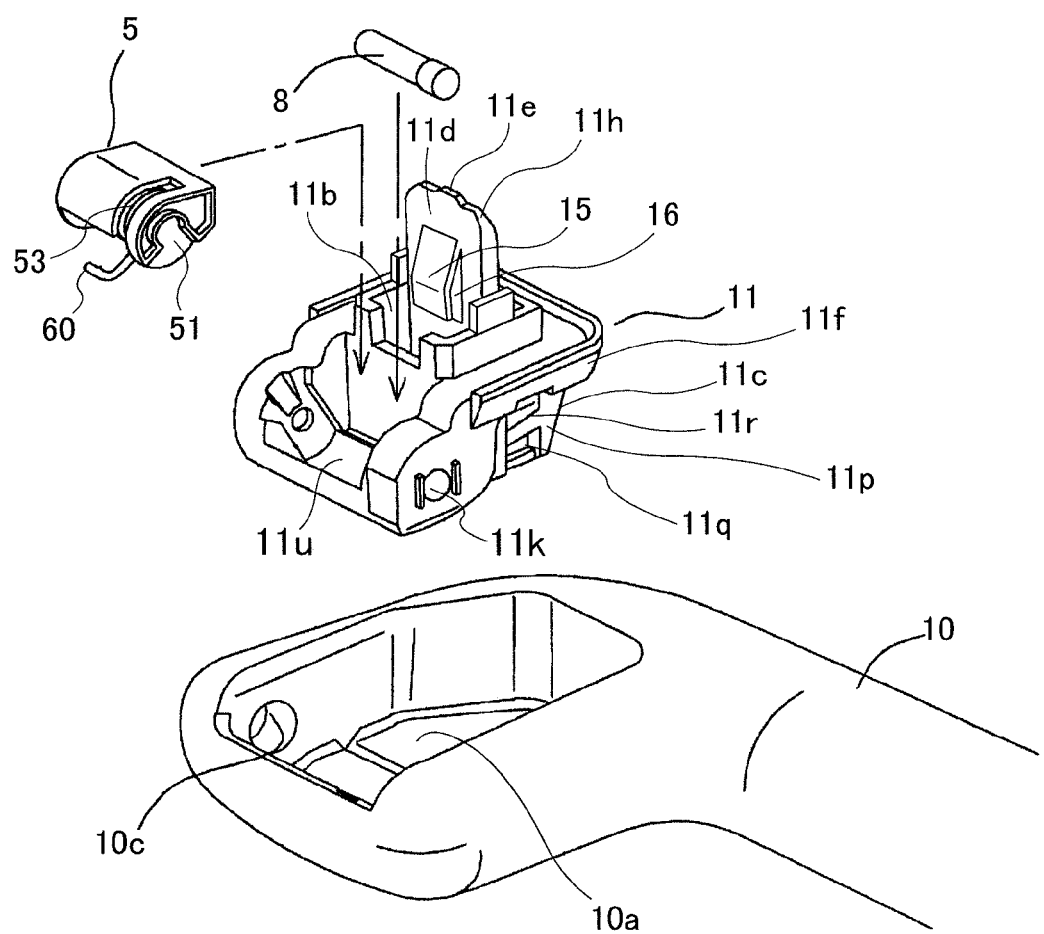
FIG. 6 is a perspective view from above of a base according to the embodiment.
Figure 7:
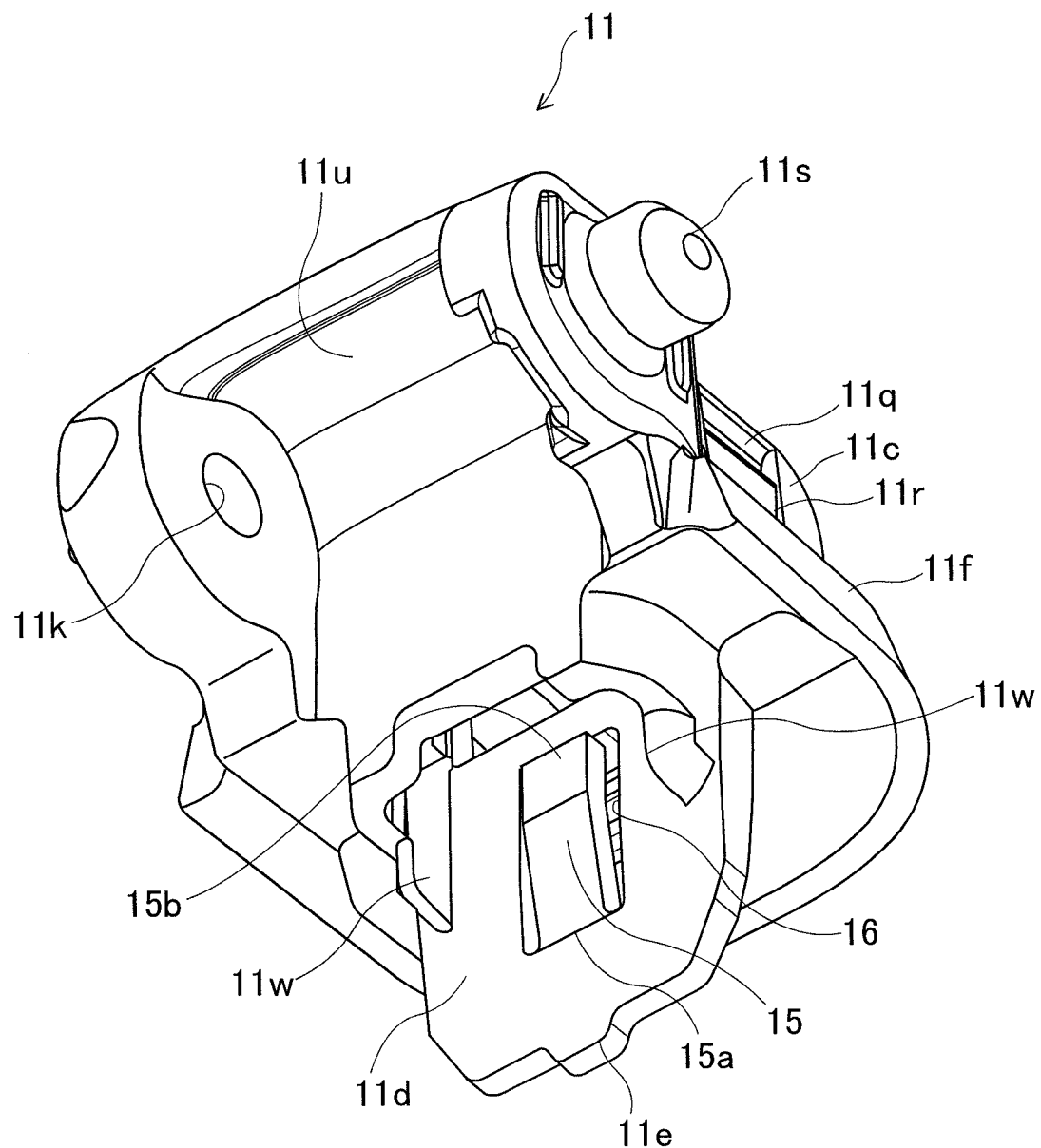
FIG. 7 is a perspective view from below of the base according to the embodiment.

As shown in FIGS. 3, 6, and 7, each base 11 of the assist grip 1 has: a temporarily fixing lock recess 11q serving as a temporarily fixing part, a permanently fixing lock recess 11r as a permanently fixing part, an contact rib 11d as a restricting part, and an elastically hooking pawl 15.

The base 11 has: a frame 11f with a clip holding hole 11b of rectangular shape, into which the clip 3 is fitted; and a cap holding wall 11c projecting upward from the frame 11f. The cap holding wall 11c has a shape that follows the internal surface of the cover 4a of the cap 4 and is covered by the cover 4a.

A projection 11m juts out from the internal surface of the frame 11f toward the center of the clip holding hole 11b. The step 3f of the clip 3 is locked on the upper edge of the projection 11m, and the pawl 3s of the clip 3 is locked on the lower edge of the projection 11m. Thus, when the clip 3 is fitted into the clip holding hole 11b, movement of the clip 3 is restricted in the directions of both insertion and separation.

On the external surface 11p of each of the pair of opposite cap holding walls 11c are the temporarily fixing lock recess 11q and permanently fixing lock recess 11r arranged in the direction of insertion of the cap 4. A step 11s is formed between the external surface 11p of the cap holding wall 11c and the external surface of the frame 11f (FIG. 10).

As shown in FIGS. 2 and 6, a recess 11u for the case is formed at the rear end of the cap holding wall 11c. The right side wall of the recess 11u for the case, which right side wall is to be located on the inside of the recess 10a, has a through-hole 11k. The left side wall of the recess 11u for the case has a shaft projection 11s formed integrally so as to project outward along the same axis as the through-hole 11k.

The base 11 held in the left recess 10a of the grip body 10 is provided with a spring case 5 and a pin member 8, which are disposed in the recess 11u for the case. A coil spring 6 is accommodated in the spring case 5. One end 61 of the coil spring 6, which is short, is locked to the spring case 5 whereas the other end 60, which is bent in L-shape, is passed through a slit 53 in the spring case 5 so as to be movable in a circumferential direction. This other end 60 is locked to an engagement part 10c of the recess 10. With this configuration, the spring coil 6 presses the grip body 10 in the direction in which the recess 11u for the case covers the base 11. As shown in FIG. 6, the pin member 8, made of metal, is held between one of the upright walls 51 of the spring case 5 in the axial direction and the through-hole 11k of the left side wall of the recess 11u for the case.

As shown in FIG. 2, the base 11 held in the right recess 10a of the grip body 10 is provided with an oil damper 7 and a pin member 8, which are disposed in the recess 11u for the case. The oil damper 7 comprises a rib 70 at its axially leading end and also provided with an engagement projection 71 on the external circumferential surface of its outer case. The rib 70 is locked in a receding part (not shown) of the recess 11u for the case, and the engagement projection 71 is locked to a damper lockable part 10e formed on the internal surface of the recess 10a. When the grip body 10 is rotated with respect to the base 11, the damper axis of the oil damper 7 is rotated with respect to the outer case, thereby applying an appropriate rotation resistance.

As shown in FIGS. 2 and 3, the base 11 has, in addition, a contact rib 11d projecting below the frame 11f. The contact rib 11d restricts movement of the clip 3 in the direction of separation when the clip 3 is fitted into the mounting hole 2a of the vehicle-body-side panel 2. The contact rib 11d divides the clip holding hole 11b into two sections by its being disposed in the middle of the clip holding hole 11b. The contact rib 11d is in the form of a flat plate and has a width roughly identical to that of the clip 3.

As shown in FIG. 7, the leading end 11e of the contact rib 11d is chamfered and reduced in width. As shown in FIGS. 3 and 4, this leading end 11e is inserted into a leading-end holding hole 3j formed in the leading end 3g of the clip 3, and thereby positions the contact rib 11d roughly in the middle of the depth D of the internal space 3b of the clip 3. A grip 3w extends towards the middle of the leading-end holding hole 3j from the leading end of each of the pair of side walls 3e such that the contact rib 11d is elastically sandwiched by these grips 3w. Therefore, the clip 3 is stably held by the contact rib 11d without allowing backlash.

Reinforcing parts 11w are fixed at both ends of the contact rib 11d in the direction C of width, each reinforcing part 11w extending downward from the frame 11f and having a width J in a direction orthogonal to the direction C of width. The side walls 3e of the clip 3 are supported by the reinforcing parts 11w at both ends in the direction of width. Accordingly, the reinforcement parts 11w restrict shaking of the clip 3 in the direction C of width.

As shown in FIG. 7, roughly in the middle of the contact rib 11d, a quadrangular hole 16 is formed and the elastic hooking pawl 15 is fixed so as to extend obliquely upward from the lower edge of the hole 16. The elastic hooking pawl 15 has the form of a plate and is elastically deformable in the direction of its thickness. The first end 15a (which is lower) of the elastic hooking pawl 15 is connected to the lower edge of the hole 16 of the contact rib 11d, and the second end 15b (which is upper) is a free end. As shown in FIGS. 7 and 3, the elastic hooking pawl 15 is bent at a certain point in the direction in which the pawl 15 extends, and a portion of the pawl 15 near the second end 15b extends parallel to the direction of insertion of the cap 4. Both the surface and back of the elastic hooking pawl 15 face the pair of side walls 3e.

The elastic hooking pawl 15 juts out from the hole 16, with the first end 15a as its base point. The elastic hooking pawl 15 inclines from the first end 15a toward the second end 15b so as to come closer to one of the pair of side walls 3e. The portion of the elastic hooking pawl 15 near the second end 15b is located near and opposite the protrusion 3m of the elastic lockable part 3a formed on one of the pair of side walls 3e.

The caps 4, spring case 5, grip body 10, and bases 11 are each formed of injection-molded resin using a die.

Figure 8:
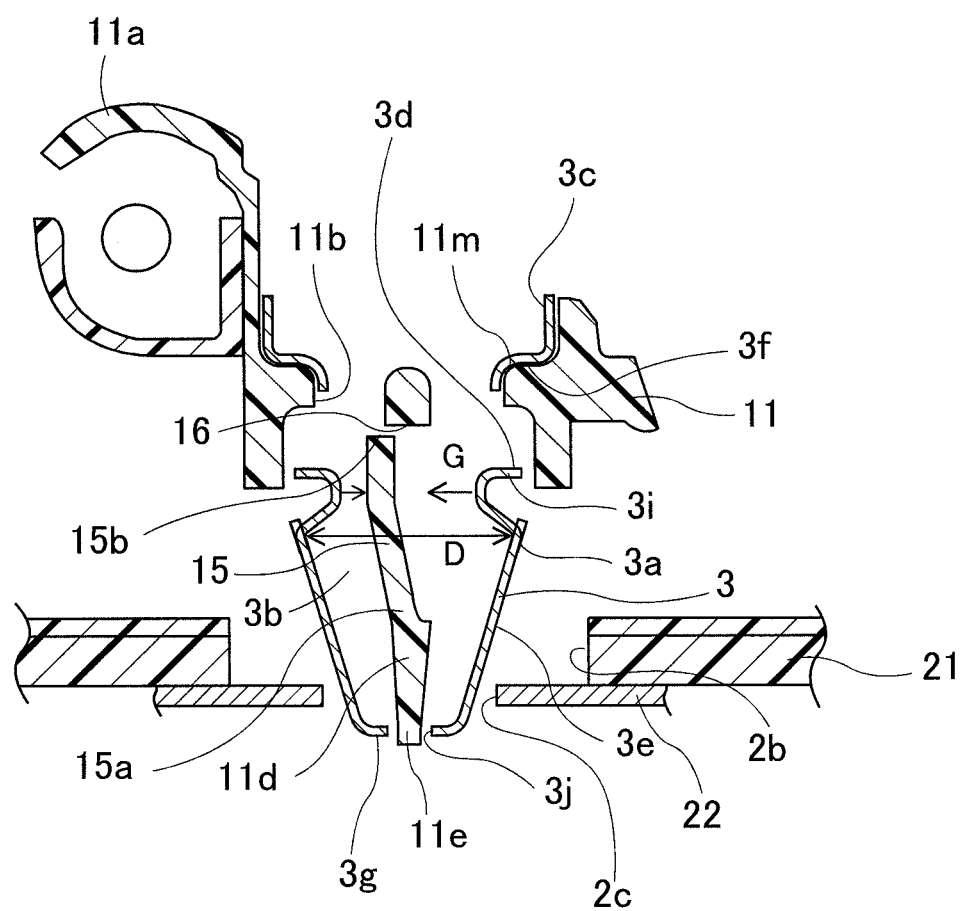
FIG. 8 is a sectional view taken along the line I-I in FIG. 1 indicating the mounting structure for an assist grip during a mounting process.

Next will be described a method for mounting the assist grip 1 on the vehicle-body-side panel 2. First, as shown in FIG. 8, the side walls 3e of each clip 3 are pressed in the direction G toward the center of depth, thereby decreasing the depth D of the internal space 3b of the clip 3. In this state, the clip 3 is inserted into the clip holding hole 11b of the base 11 of the assist grip 1 from the basal-end 3d side. Consequently, the side walls 3e of the clip 3 are inserted toward the upper side of the clip holding hole 11b from the lower side thereof while sliding along the contact rib 11d of the base 11. The widthwise ends of the clip 3 slide along the internal surfaces of the reinforcing parts 11k formed at both the widthwise ends of the contact rib 11d, thereby aligning the width C of the clip 3 with the width of the clip holding hole 11b (see FIGS. 4 and 10). Therefore, when the clip 3 is inserted into the clip holding hole 11b, the side walls 3e of the clip 3 are slid toward the clip holding hole 11b while kept in contact with the contact rib 11d and reinforcing parts 11k. Accordingly, the clip 3 is securely guided into the clip holding hole 11b.

Then, the steps 3f formed at the basal ends 3d (of the pair of side walls 3e) of the clip 3 are locked on the respective upper edges of the projections 11m of the frame 11f, and pawls 3s are locked to the respective lower edges of the projections 11m (see FIG. 3). At this time, the leading end 11e of the contact rib 11d is fitted into the leading-end holding hole 3j formed at the leading end 3g of the clip 3, and a tapering or step-like lockable part 11h formed in the vicinity of the leading end 11e of the contact rib 11d is locked on the peripheral edge of the leading-end holding hole 3j (see FIG. 8). Thus, the clip 3 is held in the corresponding base 11 and the contact rib 11d is positioned approximately in the center of depth D of the internal space 3b of the clip 3.

Figure 9:
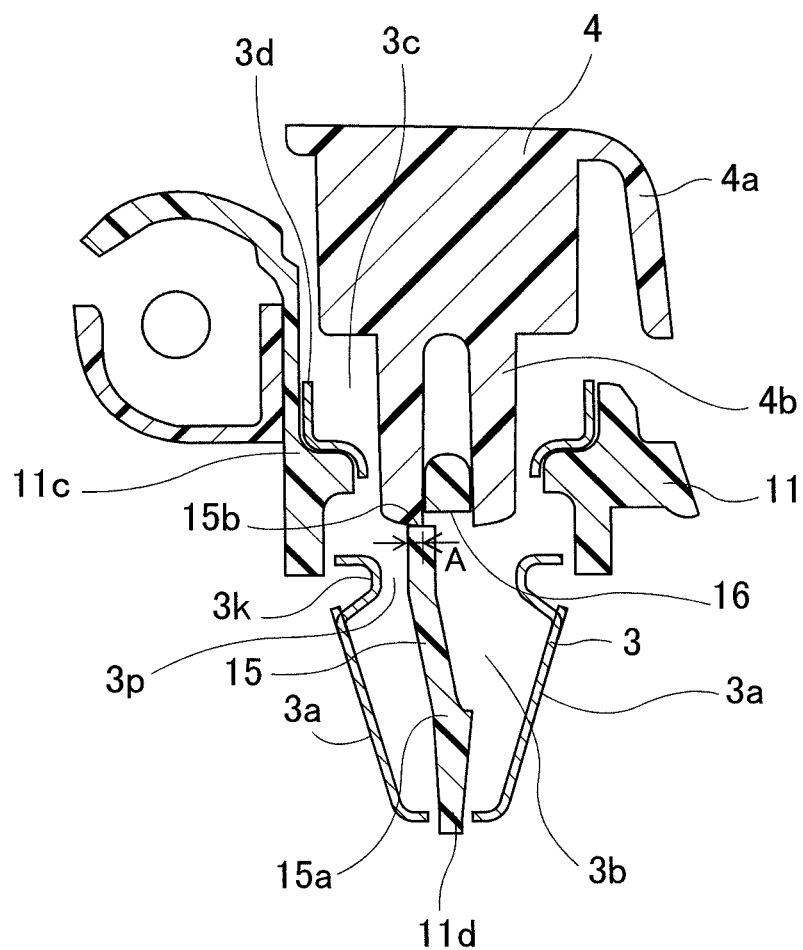
FIG. 9 is a sectional view taken along the line I-I in FIG. 1 indicating the mounting structure for an assist grip during a mounting process.

Next, as shown in FIGS. 9 and 10, the leg parts 4b of the cap 4 are temporarily inserted into the internal space 3b of the clip 3 from the opening 3c defined by the basal ends 3d of the clip 3. At this time, as shown in FIG. 10, the locked projections 4g projecting toward the internal surface of the cover 4a of the cap 4 are locked in the corresponding temporarily fixing lock recesses 11q of the cap holding walls 11c of the base 11, and the insertion is temporarily stopped in this position such that the cap 4 is held in the temporarily fixed position. As shown in FIG. 9, while the cap 4 is held in the temporarily fixed position, the leading ends of the leg parts 4b are disposed in the internal space 3b of the clip 3 with being guided by the upper part of the contact rib 11d of the base 11.

The elastic hooking pawl 15 is disposed in an interference area that interferes with the insertion path extending from the respective temporarily fixed positions for the leg parts 4b of the cap 4 to their permanently fixed positions. That is, the elastic hooking pawl 15 may be disposed in the temporarily fixed position for the leg parts 4b of the cap 4 or may be disposed at a certain point in the foregoing insertion path. Before the insertion of each clip 3 into the corresponding mounting hole 2a of the vehicle-body-side panel 2, the elastic hooking pawl 15 is not disposed in the permanently fixed positions for the leg parts 4b. The elastic hooking pawl 15 restricts the entry of the leg parts 4b into their respective permanently fixed positions. When the cap 4 is in the temporarily fixed position, the leg parts 4b may be separate from the second end 15b of the elastic hooking pawl 15 but may be in contact with this second end 15b. In this embodiment, the respective lower ends, in particular, of the sandwiched parts 4d of the leg parts 4b interfere with the second end 15b of the elastic hooking pawl 15 (See FIGS. 5 and 11). In order to cause the lower ends of the sandwiched parts 4d to securely interfere with the second end 15b of the elastic hooking pawl 15 when the cap 4 is at the temporarily fixed position, the leg parts 4b of the cap 4 are located so as to overlap the elastic hooking pawl 15 by a width A of 0.5 to 1.5 mm in the internal space.

In the internal space 3b where the elastic lockable parts 3a are located, an empty space 3p is left in the direction of depth between the elastic lockable parts 3a and the elastic hooking pawl 15. Accordingly, the elastic lockable parts 3a can easily be deformed in the direction of depth of the internal space 3b. The contact rib 11d is interposed between the pair of leg parts 4b of the cap 4. The leg parts 4b are inserted into the internal space 3b of the clip 3 while guided by the contact rib 11d.

Figure 15:
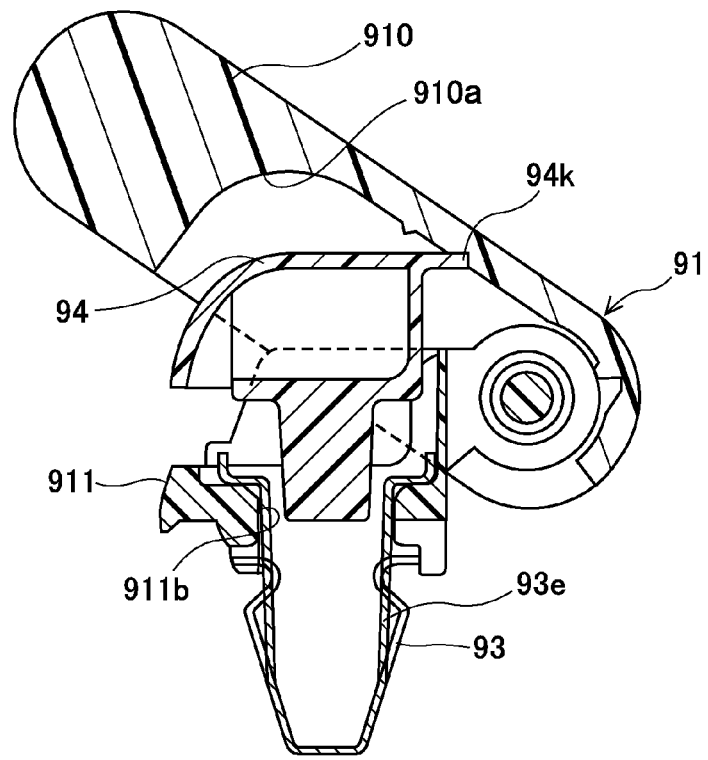
FIG. 15 is an upper sectional view taken along the line IV-IV in FIG. 2 indicating the mounting structure for an assist grip during a mounting process, and a lower sectional view taken along the line II-II in FIG. 2 indicating the mounting structure for an assist grip during a mounting process.
Figure 15:
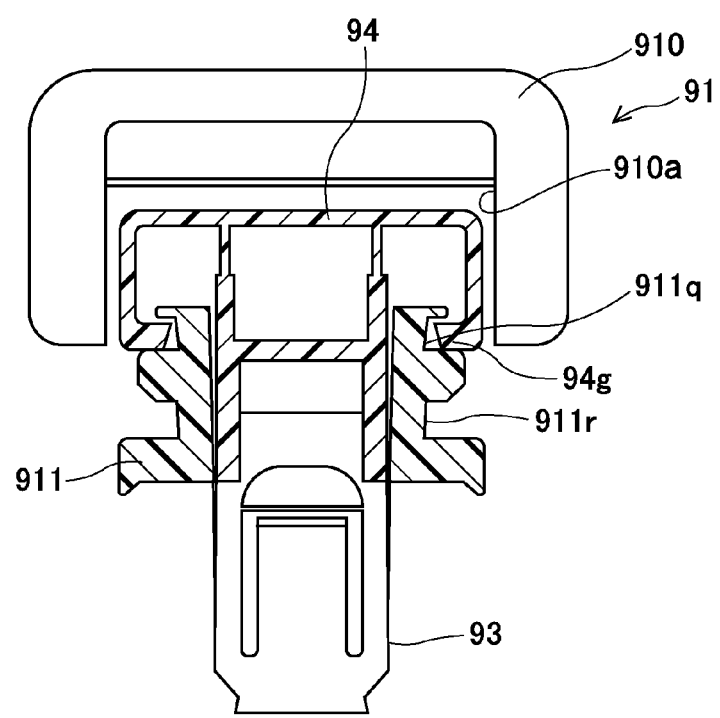
Figure 16:
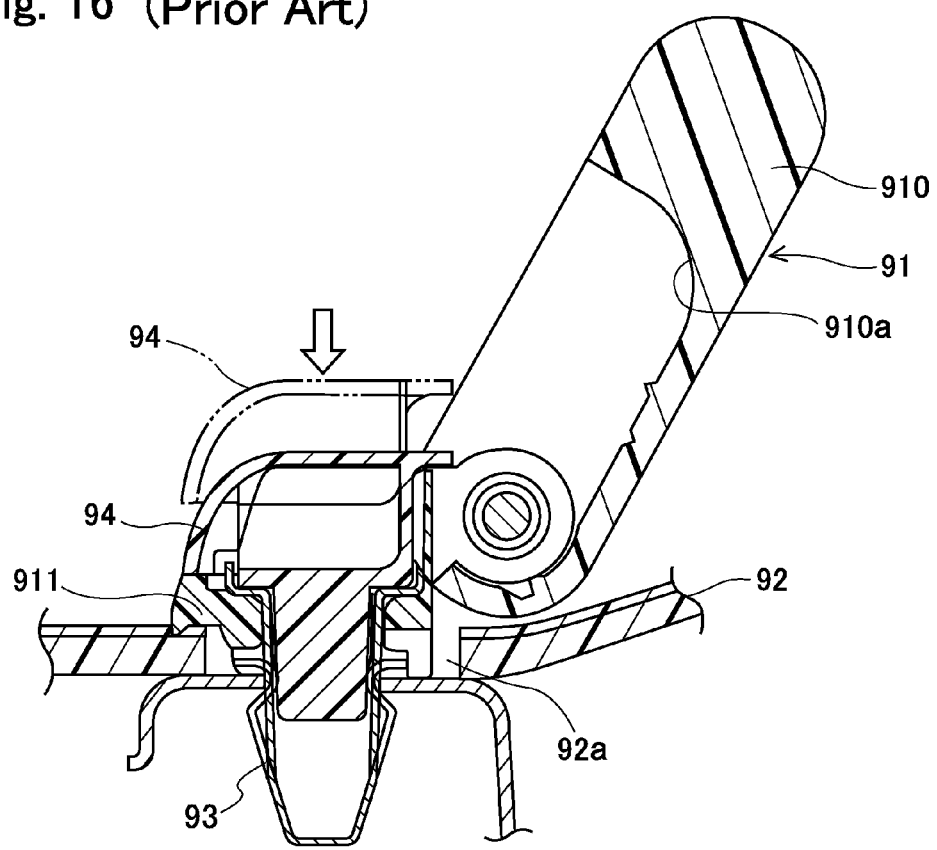
FIG. 16 is an upper sectional view taken along the line III-III in FIG. 1 indicating the mounting structure for an assist grip in a mounted state, and a lower sectional view taken along the line II-II in FIG. 2 indicating the mounting structure for an assist grip in a mounted state.
Figure 16:
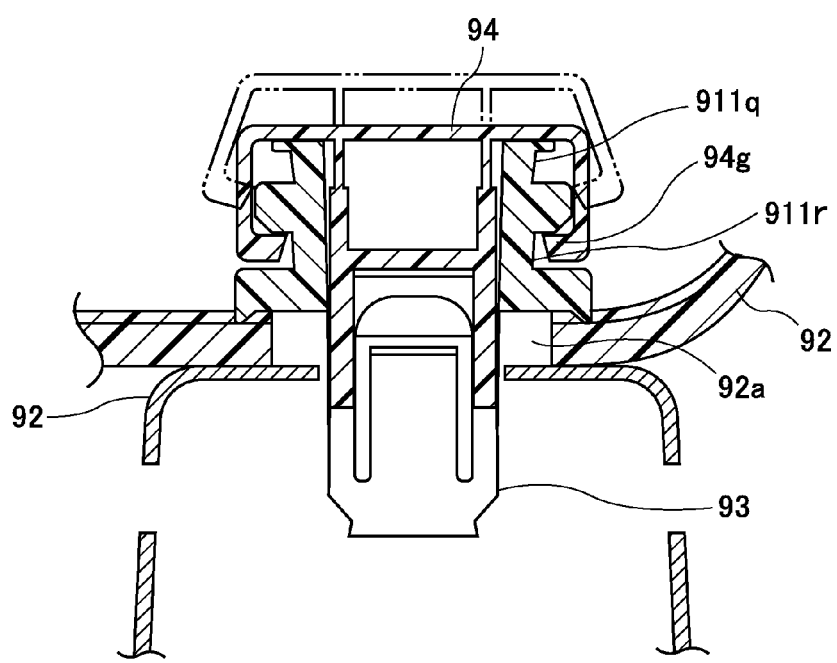

Next, as shown in FIG. 10, each base 11 is disposed in the corresponding recess 10a of the grip body 10. The shaft projection 11s is inserted into the right shaft hole 10b of the recess 10a and the pin member 8 projecting through the through-hole 11k is inserted into the left shaft hole 10b. Thus, the grip body 10 is mounted on the bases 11. Additionally, an end (referred code 94k in FIG. 15) of the cap 4 is disposed in contact with the internal surface of the recess 10a. Thus, the clips 3, caps 4, and grip body 10 are integrally held on the bases 11.

Figure 11:
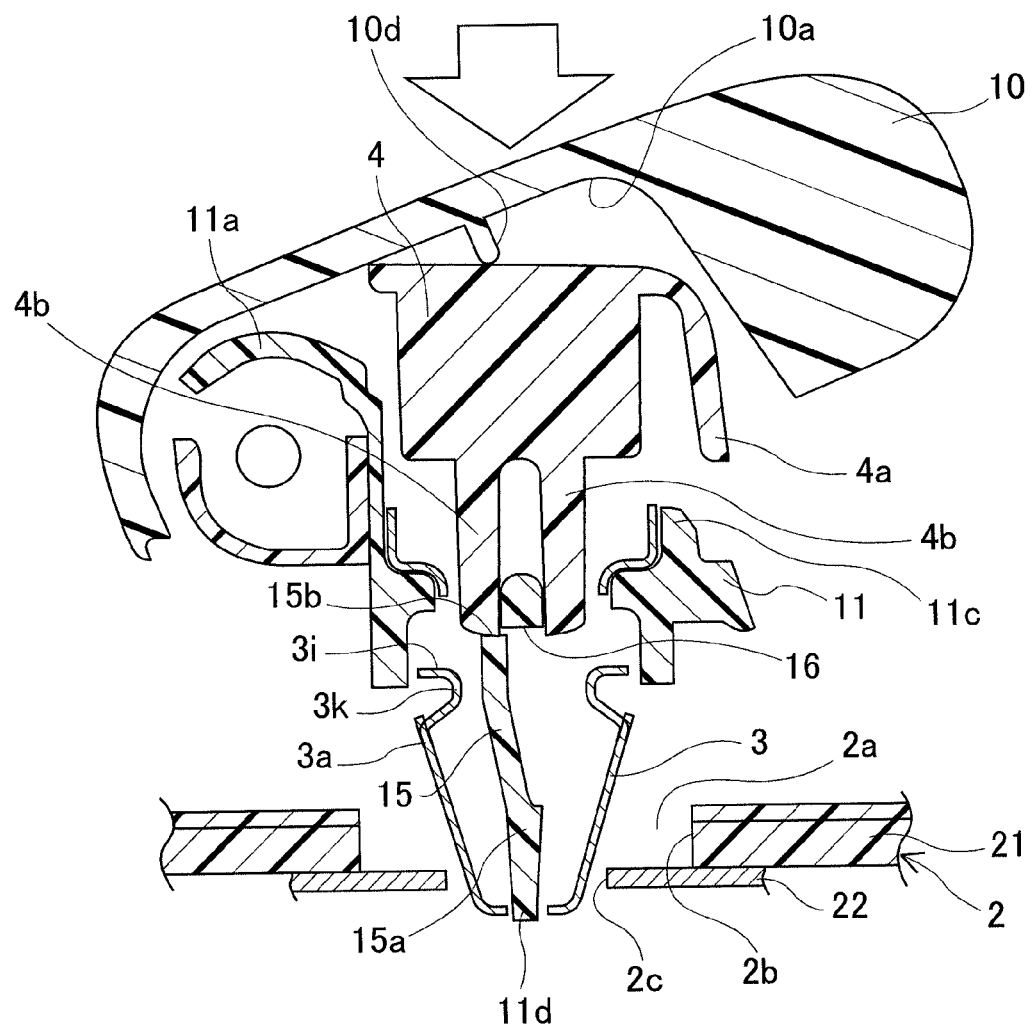
FIG. 11 is a sectional view taken along the line I-I in FIG. 1 indicating the mounting structure for an assist grip during a mounting process.

Subsequently, as shown in FIG. 11, the grip body 10 is pressed toward the vehicle-body side panel 2 (in the direction of the arrow in FIG. 11). As a result, the cover 4a of the cap 4 is pressed by a projection 10d jutting out from the internal surface of each recess 10a of the grip body 10. Consequently, the locked projections 4g of the cap 4 are unlocked from the temporarily fixing lockable parts 11q of the cap holding walls 11c of the base 11, and the cap 4 is inserted permanently in the direction of insertion (see FIG. 10). Consequently, the cap holding walls 11c come into contact with the internal surface of the cover 4a such that the basal end 3d side of the clip 3 and the cap holding walls 11c of the base 11 are covered by the cover 4a. Also, the leg parts 4b of the cap 4 are fitted into the internal space 3b of the clip 3.

Figure 12:
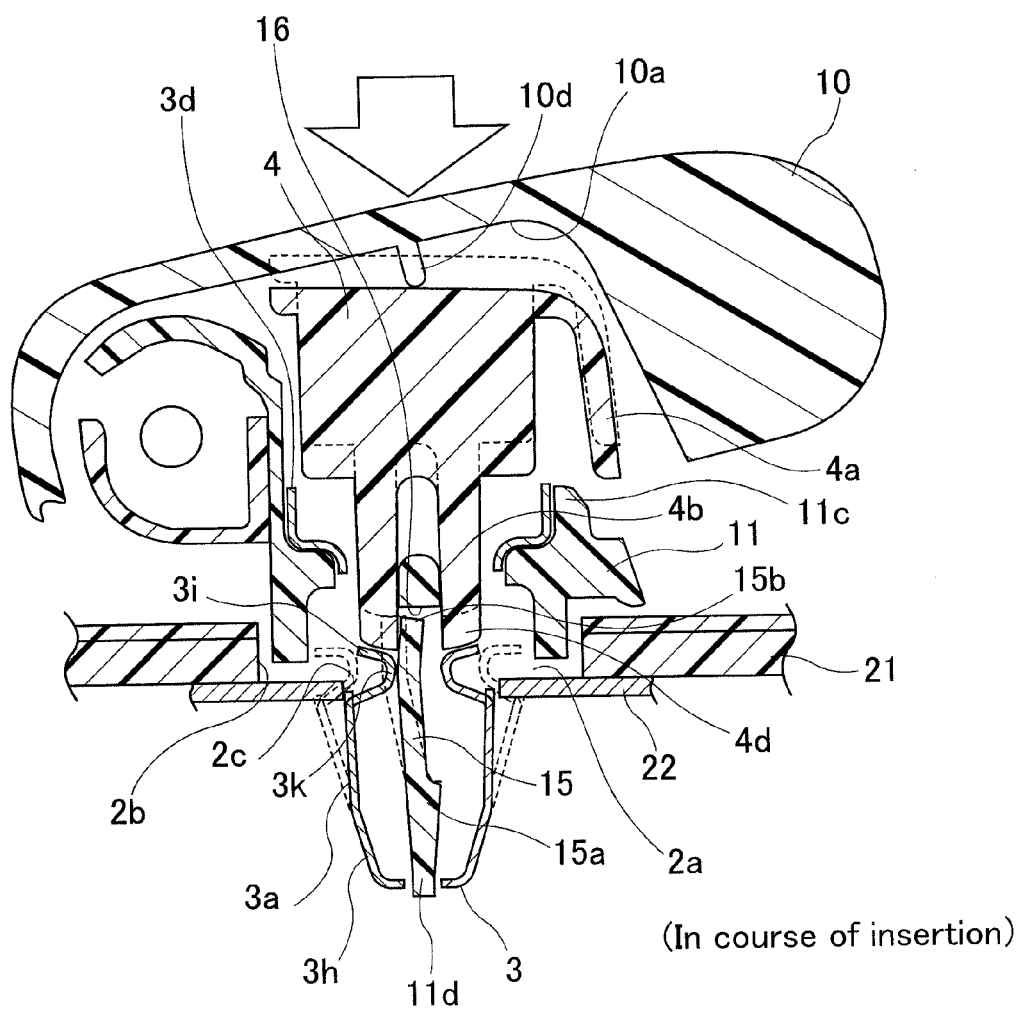
FIG. 12 is a sectional view taken along the line I-I in FIG. 1 indicating the mounting structure for an assist grip during a mounting process.
Figure 13:
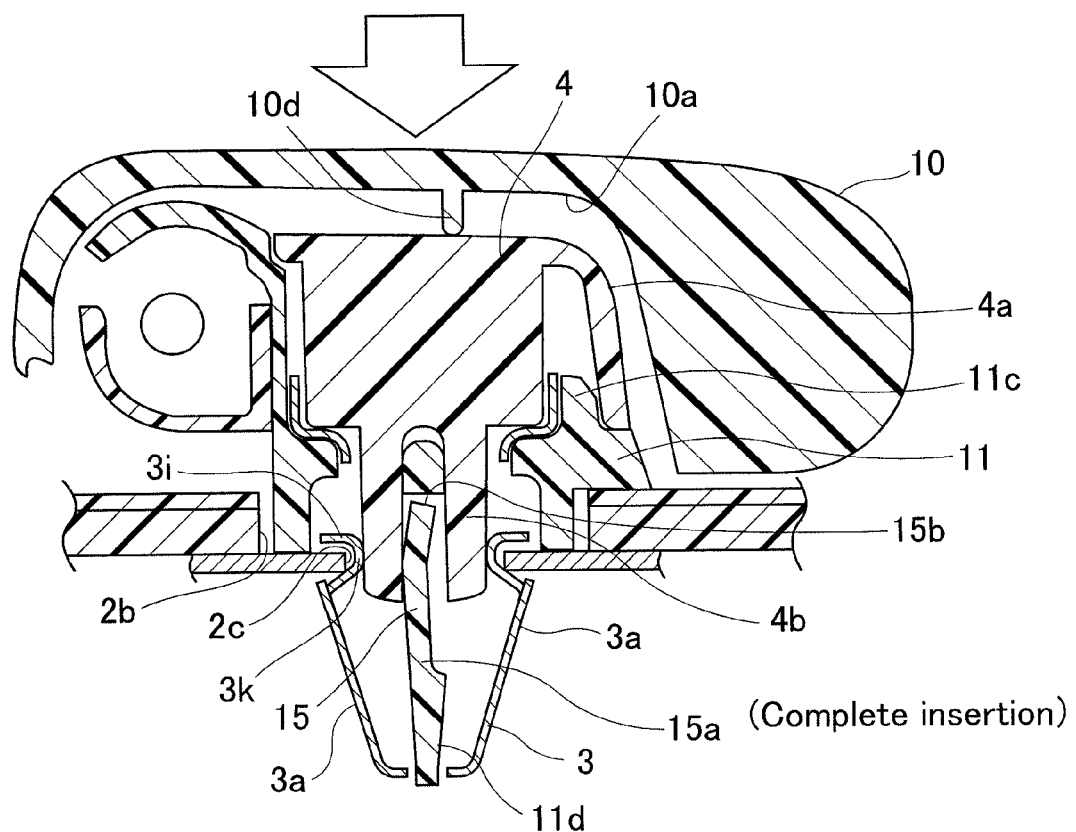
FIG. 13 is a sectional view taken along the line I-I in FIG. 1 indicating the mounting structure for an assist grip when the grip main body is held on the vehicle-body-side panel in a mounted state.
Figure 14:
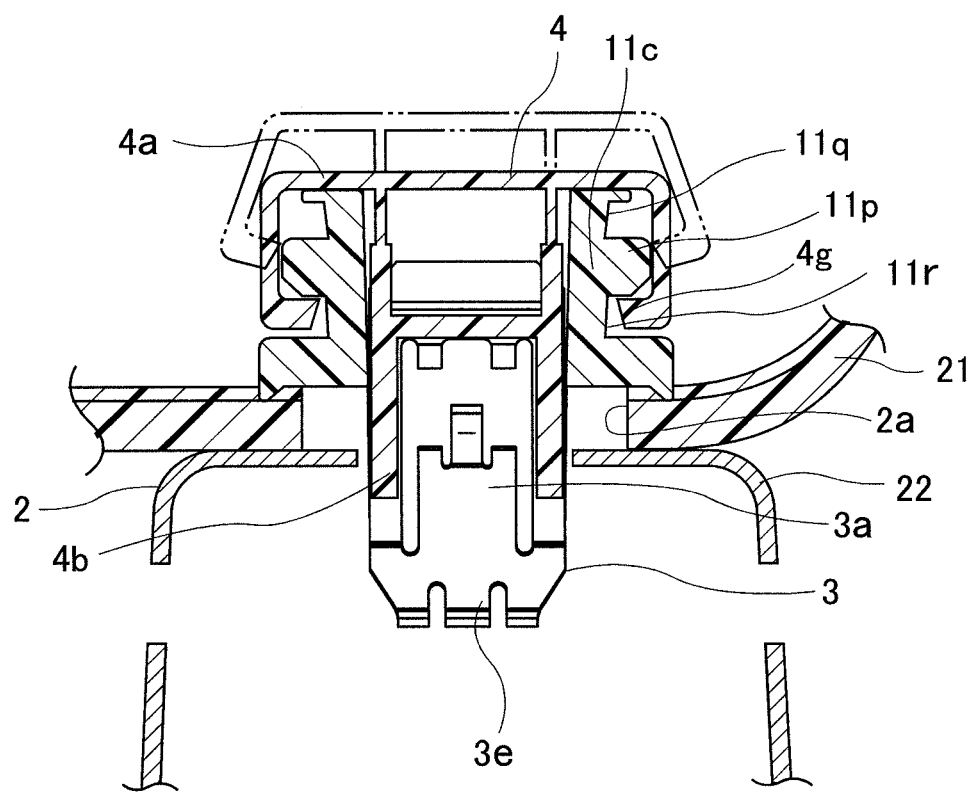
FIG. 14 is a sectional view taken along the line II-II in FIG. 2 indicating the mounting structure for an assist grip in a mounted state.

Further, as shown in FIG. 12, the leg parts 4b of the cap 4 press the base 11 (see FIG. 10), and the clip 3 held by the base 11 is consequently fitted into the corresponding mounting hole 2a of the vehicle-body-side panel 2. As a result, the respective protrusions 3m of the elastic lockable parts 3a are pressed against the internal walls of the internal-panel pierced portion 2c defined in the mounting hole 2a. The elastic lockable parts 3a of the clip 3 are elastically deformed toward the internal space 3b, so that the depth D of the internal space 3b is decreased. The protrusions 3m of the elastic lockable parts 3a are passed through the mounting hole 2a. At this time, the receding parts 3k of the elastic lockable parts 3a press the elastic hooking pawl 15 in a direction G toward the center of the internal space 3b. The elastic hooking pawl 15 is shifted widthwise in the internal space 3b and is withdrawn into the hole 16. Specifically, the elastic hooking pawl 15 is withdrawn from the interference area that interferes with the insertion path of the leg parts 4b of the cap 4. As a result, the leg parts 4b of the cap 4 are released from any restriction to entry, and the leg parts 4b move further into the internal space 3b of the clip 3.

The elastic lockable parts 3a of the clip 3 temporarily reduce the depth D of the internal space 3b and are passed through the mounting hole 2a. Upon passage of the elastic lockable parts 3a through this hole 2a, these lockable parts 3a increase the depth D by their own elastic forces and return to their original positions.

The leg parts 4b of the cap 4 are released from interference with the elastic hooking pawl 15, and enter. When the cap 4 is in the temporarily fixed position, the receding parts 3k of the elastic lockable parts 3a are located in the insertion path extending from the temporarily fixed position for the leg parts 4b to their permanently fixed position. Upon passage of the receding parts 3k through the mounting hole 2a, these receding parts 3k are withdrawn from the interference area that interferes with the paths of insertion of the leg parts 4b. Accordingly, the leg parts 4b are able to move further into the internal space 3b.

Each of portions extending from the receding parts 3k, formed in the upper parts of the corresponding elastic lockable part 3a, to the ends 3i, has a shape that gradually inclines in the direction of separation from the inside of the internal space 3b toward the outside thereof. In the leg parts 4b of the temporarily fixed cap 4, each of the sandwiched parts 4d located in positions interfering with the corresponding elastic lockable parts 3a also has a shape that gradually inclines in the direction of separation from the inside of the internal space 3b toward the outside thereof. In the temporarily fixed state of the leg parts 4b, the sandwiched parts 4d of the leg parts 4b face the foregoing portions (i.e., the portions extending from the receding parts 3k, formed in the upper parts of the corresponding elastic lockable part 3a, to the ends 3i). Accordingly, when the leg parts 4b are brought into contact with these portions (extending from the elastic lockable parts 3a of the receding parts 3k to the ends 3i) during the entry of the cap 4 in the direction of insertion, the elastic lockable parts 3a are elastically deformed outwards. Consequently, the empty space between each elastic lockable part 3a and the elastic hooking pawl 15 is increased, thus making it possible to move the leg parts 4b toward their respective permanently fixed positions securely. In this case, by sufficiently increasing the distance between the position of each temporarily fixed leg part 4b and the receding part 3k of the corresponding elastic lockable part 3a, the leg parts 4b are able to enter the internal space 3b smoothly without contacting the elastic lockable parts 3a.

As shown in FIG. 5, the posts 4c of the leg parts 4b of each cap 4 contact the flat parts 3h of the side walls 3e of the clip 3 and restrict deformation of the entire clip 3 except the elastic lockable parts 3a. As a result, empty space in the direction of depth of the internal space 3b of the clip 3 is eliminated, making it difficult for the elastic lockable parts 3a to be deformed in the direction G toward the center of depth of the internal space 3b, and also making it difficult for the side walls 3e of the clip 3 and the receding parts 3k of the elastic lockable parts 3a to be curved in the direction G toward the center of depth, thus preventing separation of the clip 3 from the mounting hole 2a. The locked projections 4g of the cover 4a of each cap 4 are fitted in the permanently fixing lock recesses 11r of the corresponding base 11 such that the assist grip 1 is permanently fixed to the vehicle-body-side panel 2. By simply applying load on the caps 4 by use of the grip body 10 in such a manner, the clips are inserted into the mounting holes 2a and the caps 4 are permanently fixed.

In the present embodiment, each base 11 has an elastic hooking pawl 15. This elastic hooking pawl 15 is disposed in an interference area that interferes with the insertion path of the cap 4 when the cap 4 is held in a temporarily fixed position. At this time, the assist grip 1 is in the state of being temporarily fixed by the caps 4 with the clips 3 attached to the bases 11. The temporarily fixed assist grip 1 is portable. For example, during its conveyance, significant load may be applied to the temporarily fixed cap or caps in the direction of their insertion. In such a case also, since each elastic hooking pawl 15 is located in the insertion path of the leg parts 4b of the corresponding cap 4, the cap 4 is prevented from entering a permanently fixed position erroneously.

Since the second end 15b of each elastic hooking pawl 15 extends in the direction of insertion of corresponding cap 4, strength increases with respect to load applied in the direction of insertion. Accordingly, even if a temporarily fixed cap 4 receives load in the direction of insertion, the elastic hooking pawl 15 is sufficient to withstand load transmitted from the cap 4.

When the assist grip 1 is mounted on the vehicle-body-side panel 2, the elastic lockable parts 3a are elastically deformed inside by the internal walls of the corresponding mounting hole 2a upon insertion of the corresponding clip 3 into this hole 2a, resulting in the elastic deformation of the corresponding elastic hooking pawl 15. Accordingly, the cap 4 is released from the elastic hooking pawl 15 restricting entry of this cap, and is able to enter a permanently fixed position.

By simply applying load on the caps 4 in such a manner, a single step takes place such that the corresponding clips 3 are inserted into the corresponding mounting holes 2a and these caps 4 are permanently fixed. This eliminates the need to uncover the recesses 10a to expose the caps 4 by rotating the grip body 10 relative to the bases 11, as in a conventional manner. Accordingly, man-hours required for mounting the assist grip 1 can be reduced.

In the present embodiment, an assist grip is used as a part. However, the present invention can also be used for mounting structures for other vehicle-parts or other various parts.

The invention claimed is:

1. A mounting structure for parts, the structure comprising:
   a part with a base, the base comprising:
     a clip-holding hole, and
     a contact rib at a lower portion of the clip-holding hole so as to divide the clip-holding hole into two sections, the contact rib comprising:
       a hole at a lower end thereof, and
       an elastic hooking pawl extending upwardly from a bottom portion of the hole and laterally away from the contact rib and at least partially into one of the two sections of the clip-holding hole, thereby defining an interference area;
   a mounting member with a mounting hole;
   a clip including:
     a pair of held parts at an upper portion thereof, which are held in the clip-holding hole of the base,
     a pair of side walls, each extending from a respective one of the held parts, and inserted into the mounting hole, and
     an elastic lockable part provided on each side wall and lockable on a peripheral edge of the mounting hole,
   wherein the pair of side walls define an internal space between them, are connected at lower ends thereof, and define an opening between upper ends thereof, the opening communicating with the internal space; and
   a cap comprising opposing leg parts insertable into the internal space from the opening such that the opposing leg parts are received within the two sections of the clip-holding hole of the base,
   wherein the cap is selectively connected to the base at either a temporarily fixed position or a permanently fixed position, whereby:
     in the temporarily fixed position, one of the opposing leg parts is prevented from moving in an insertion direction by contact with the elastic hooking pawl in the interference area; and
     when the cap is moved further in the direction of insertion from the temporarily fixed position to the permanently fixed position, each of the elastic lockable parts of the clip is elastically deformed toward the inside of the internal space by an internal wall of the mounting hole and an inwardly-protruding portion of one of the elastic lockable parts is pressed against the elastic hooking pawl such that the elastic hooking pawl is withdrawn from the interference area, thereby allowing insertion of the cap to continue until the elastic locking parts are fully inserted through the mounting hole.

2. The mounting structure for parts according to claim 1, wherein the base has a restricting part that extends in the direction of insertion of the cap and presses the clip in the direction of insertion of the cap, thereby restricting movement of the clip in a direction in which the clip is separable from the mounting hole,
   wherein a first end of the elastic hooking pawl in the direction of insertion of the cap is connected to the restricting part, and
   wherein a second end thereof, which is opposite the first end in the direction of insertion of the cap of the elastic hooking pawl, is a free end and located in the interference area.

3. The mounting structure for parts according to claim 2, wherein the elastic hooking pawl extends from the first end, connected to the restricting part, at an angle to the direction of separation of the cap, and this pawl is bent or curved near the second end so as to be parallel to the direction of separation of the cap.

* * * * *